July 22, 1924.
J. S. MULTER
1,502,516
DEMOUNTABLE RIM
Filed July 9, 1923
2 Sheets-Sheet 2
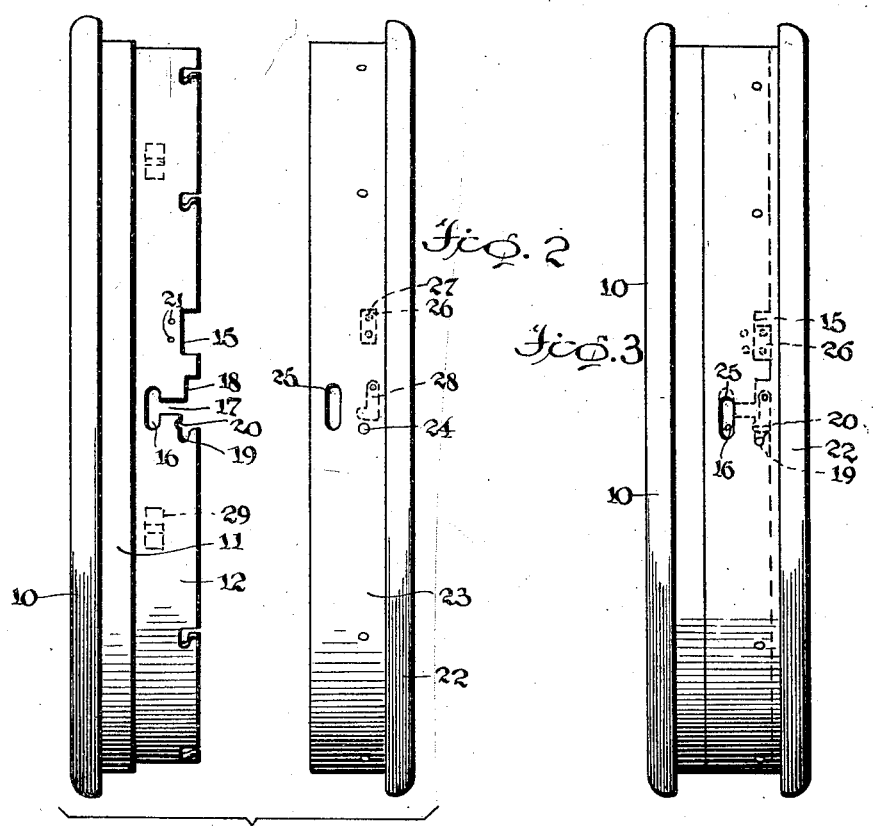
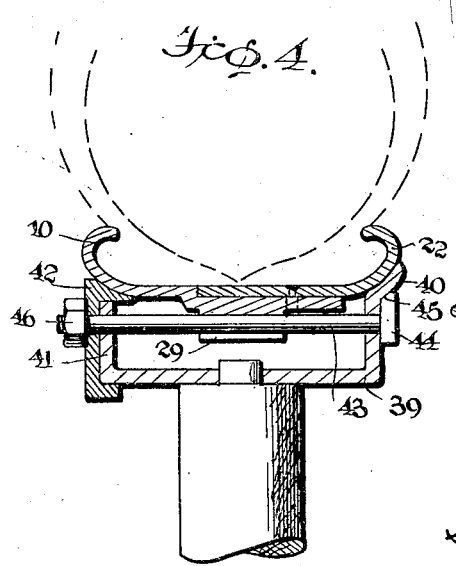
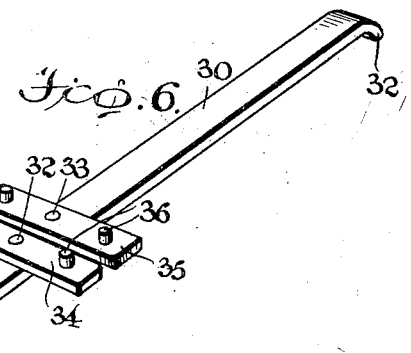
INVENTOR.
John S. Multer,
BY
Geo. P. Kimmel
ATTORNEY.

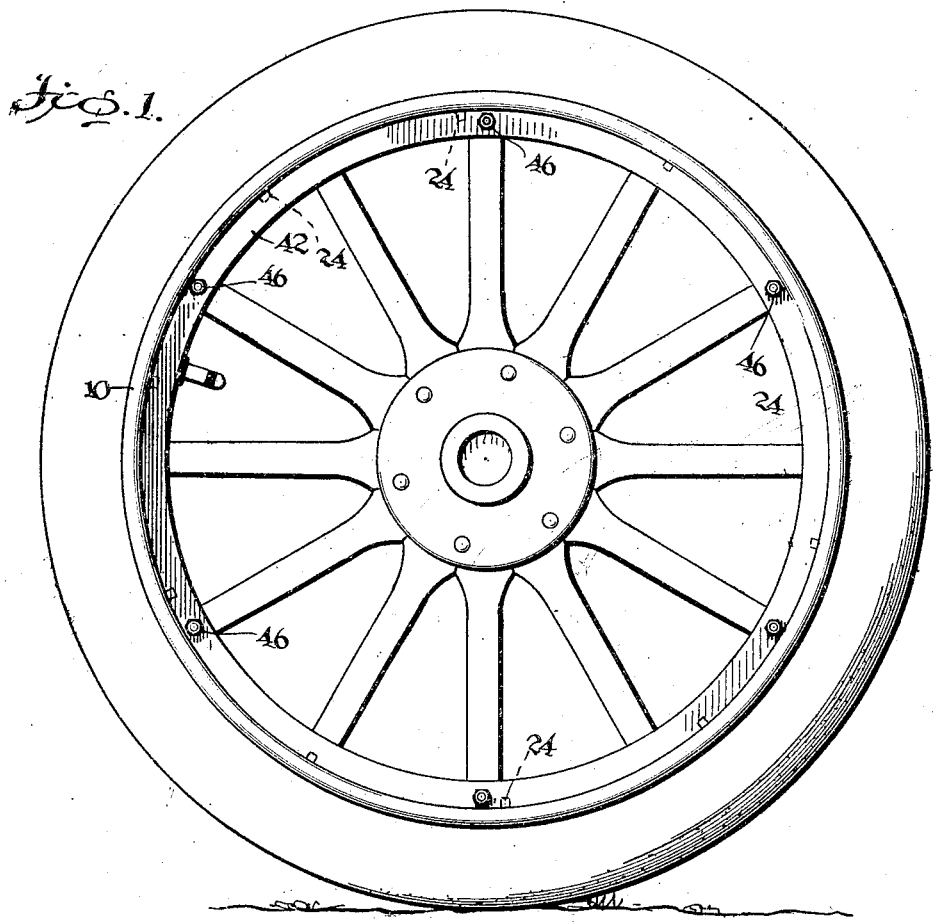
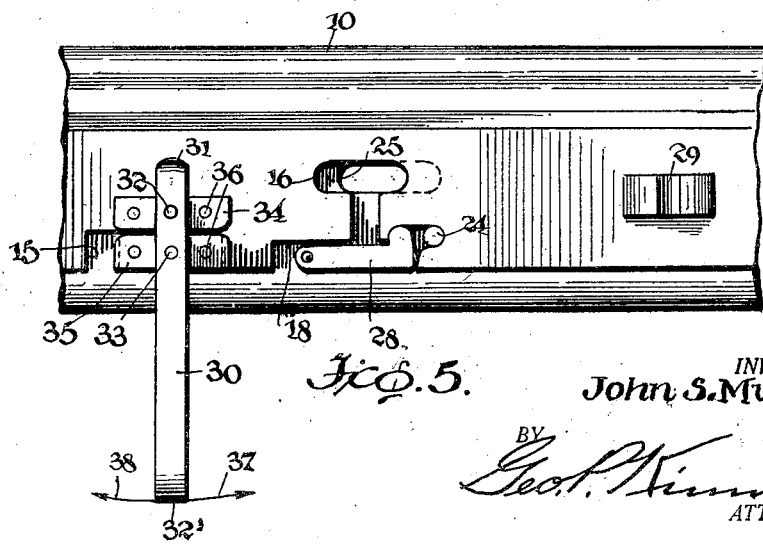

Patented July 22, 1924.

1,502,516

UNITED STATES PATENT OFFICE.

JOHN STANLEY MULTER, OF PORTSMOUTH, OHIO.

DEMOUNTABLE RIM.

Application filed July 9, 1923. Serial No. 650,514.

*To all whom it may concern:*

Be it known that I, JOHN STANLEY MULTER, a citizen of the United States, residing at Portsmouth, in the county of Scioto and State of Ohio, have invented certain new and useful Improvements in Demountable Rims, of which the following is a specification.

This invention relates to demountable rims for vehicle wheels, more particularly to a type thereof adapted to be removed from the wheel in its entirety to facilitate the removal of the tire from a wheel or the mounting of the tire thereupon, and the invention has for its object to provide, in a manner as hereinafter set forth, a demountable rim comprising two sections having telescopic engagement with each other, in which the interlocking of the two sections is secured by a limited rotation, one relative to the other, and to further provide means in a manner as hereinafter set forth, to prevent the shifting of the sections of the rim circumferentially with respect to each other when they have been positioned in interlocking engagement with each other.

A further object of the invention is to provide, in a manner as hereinafter set forth, a demountable rim having means for the reception of a tool for the purpose of shifting the sections of the rim circumferentially with respect to each other so as to move the sections into interlocking engagement.

Further objects of the invention are to provide a demountable rim, in a manner as hereinafter set forth, which is simple in its construction and arrangement, strong, durable, efficient in its use, conveniently set up for the purpose of locking the tire therewith, and comparatively inexpensive.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of a wheel showing the adaptation therewith of a demountable rim, in accordance with this invention.

Figure 2 is an elevation of the sections of the demountable rim disassembled.

Figure 3 is a like view of the sections of the rim assembled.

Figure 4 is a cross sectional view showing the adaptation of a demountable rim in accordance with this invention with respect to the felly of the wheel.

Figure 5 is a fragmentary view, broken away, of a demountable rim in accordance with this invention, looking towards the inside of the rim and further illustrating the adaptation of a tool in connection with the sections of the rim for the purpose of shifting said sections to interlocking engagement.

Figure 6 is a perspective view of the tool for shifting the rim sections.

A demountable rim in accordance with this invention, comprises a pair of telescopic sections, and each of said sections is in the form of an annulus. One of said sections comprises an outstanding continuous flange 10 of the clencher type and which has projecting inwardly from the base thereof a band comprising an outer portion 11 and an inner portion 12, the latter being inset with respect to the former, as well as being of greater width than the portion 11. The insetting of the portion 12, with respect to the portion 11, provides a continuous annular shoulder 13. The inner portion 12 is formed with a series of bayonet slots 14 which open at the free edge of the said inner portion 12, and the latter is furthermore provided, at its free edge with a rectangular recess 15. The inner portion 12 is provided, in proximity to the shoulder 13, with an oval-shaped slot 16, communicating with a transverse opening 17, which communicates with a cut-out portion 18, at the free edge of the inner portion 12. The said inner portion 12 is furthermore provided with a circumferentially extending notch 19 which opens into the cut-out portion 18. Said notch 19 is positioned at one end of the cut-out portion 18. The inner wall of the cut-out portion 18, at one side of the opening 17, has a semi-circular notch 20. The inner portion 12, in proximity to the rectangular recess 15, is formed with a pair of spaced openings 21, for a purpose to be presently referred to.

The other section of the rim comprises an out-standing continuous flange 22 of the clencher type and which has extending inwardly from the base thereof a band 23, having its inner face provided with a series of spaced lugs 24, adapted to engage in the slots 14 for the purpose of interlocking the two sections of the rim together. The band 23 is formed with an oval-shaped slot 25 which when the sections of the rim are connected together registers with the slot 16 and provides means for the passage of the air inlet valve casing. The band 23 has its inner face provided with a plate 26, formed with a pair of openings 27, and when the sections of the rim are arranged in telescopic position, the plate 26 is seated in the recess 15 and is flush with the inner face of the portion 12 as shown in Figure 3. The band 23 on its inner face carries a pivoted latch 28 which engages the notch 20, as shown in Figure 3 for the purpose of connecting the sections together to prevent circumferential movement thereof.

The inset portion 12 of one of the rim sections, has one face thereof formed with a series of spaced apertured lugs 29 for a purpose to be presently referred to.

When setting up the rim for the purpose of securing a tire in position, the latter is mounted on the band 23 with the air inlet valve casing extended through the slot 25. The band 23 is shifted to telescopic position with respect to the section 12 of the band of the other section, as shown in Figure 3 of the drawings. The opening 17 provides a clearance for the air inlet valve casing and which when the rim sections are in telescopic position extends through the opening 16. When the sections of the rim are mounted in telescopic position, the plate 26 is arranged within the recess 15 and the lugs 24 extend into the slots 14. After the rim sections have been positioned in the manner as stated, they are shifted circumferentially relative to each other, so that the lugs 24 will be moved into the circumferentially extending portions of the slots 14 and which secure the rim sections together. After the rim sections have been positioned in the manner as stated, the latch 28 is shifted so that its nose will engage in the notch 20 and this will securely lock the sections of the rim from circumferential movement thereof relative to each other.

To provide for the convenient shifting of the rim sections to interlocking position, a tool is provided, consisting of a bar 30, having oppositely extending ends 31, 32. Pivotally connected to one face of the bar 30, as at 32, 33 respectively are the plates 34, 35, and each of which is provided with a pair of lugs 36. By reference to Figure 5, the shifting tool is shown in operative position and with the lugs 36 of the plate 34 engaged in the openings 21, and with the lugs 36 of the plate 35 engaged in the openings 27 of the plate 26. Then, by swinging the outer end of the bar 30 in the direction of the arrow 37, the sections of the rim will be shifted so as to provide for the interlocking thereof through the medium of the lugs 24 and slots 14. By swinging the outer end of the bar 30 in the direction of the arrow 38, the rim sections are shifted so that they can be removed from telescopic position with respect to each other.

Referring to Figure 4 of the drawings, 39 denotes the felly of the wheel, which is channel-shaped in cross section, and has one side thereof flanged as at 40 for engagement with the flange 22. The other side of the felly 39, which is indicated at 41, is of less width than that side of the felly which is provided with the flange 40. Mounted upon the side 41 of the felly are wedge elements 42, which co-act with the flange 10. Extending through the felly 39 are retaining bolts 43, each provided with a head 44 having a bevelled edge 45, which engages the flange 40. The other ends of the bolts 43 carry securing nuts 46. The bolts 43 extend through apertured lugs 29 and prevent circumferential movement of one of the rim sections with respect to the felly. The wedge elements 42 in connection with the flanges 40 act as means for maintaining the rim sections together, as well as detachably coupling the same with the felly 39.

From the foregoing description taken in connection with the accompanying drawings, a demountable rim is set up which provides for the convenient positioning and removing of a tire when occasion requires, and although the preferred embodiment of the invention is as illustrated and described, yet it is to be understood that changes in the details of construction can be had which fall within the light of the invention as claimed.

What I claim is:—

1. A demountable rim formed of a pair of telescopic sections, each of said sections consisting of a continuous clencher flange and an inwardly extending band, each of said bands projecting inwardly from the base of the flange, one of said bands having its inner portion inset with respect to its remaining portion, thereby providing a shoulder against which the other band abuts when the sections are in telescopic position, said inset portion provided with a plurality of bayonet slots, a semi-circular notch, a rectangular recess, an oval-shaped slot, a cut-out portion, and an opening leading from said slot to said cut-out portion and further provided with a plurality of openings in proximity to said rectangular recess, the other of said bands provided with a plurality of lugs engageable in said bayonet slots and further having an oval-shaped slot adapted to register with the oval-shaped slot in the inset portion, said last mentioned band provided with a plate seating in said rectangular recess and with a latch engageable in said semi-circular notch.

2. A demountable rim formed of a pair of telescopic sections, each of said sections consisting of a continuous clencher flange and an inwardly extending band, each of said bands projecting inwardly from the base of the flange, one of said bands having its inner portion inset with respect to its remaining portion, thereby providing a shoulder against which the other band abuts when the sections are in telescopic position, said inset portion provided with a plurality of bayonet-shaped slots, a semi-circular notch, a rectangular recess, an oval-shaped slot, a cut-out portion and an opening leading from said slot to said cut-out portion and further provided with a plurality of openings in proximity to said rectangular recess, the other of said bands provided with a plurality of lugs engageable in said bayonet-shaped slots and further having an oval-shaped slot adapted to register with the oval-shaped slot in the inset portion, said last mentioned band provided with a plate seating in said rectangular recess and with a latch engageable in said semi-circular notch, said openings arranged in proximity to said rectangular recess and the openings in said apertured plate providing means for the reception of a tool for shifting said bands circumferentially with respect to each other whereby the lugs will be shifted to lock the sections of the rim together.

3. A demountable rim formed of a pair of telescopic sections, one of said sections provided with a rectangular recess and a plurality of openings in proximity to said recess, the other of said sections provided with a plate formed with a plurality of openings, said plate adapted to seat in said recess when the sections are in telescopic engagement, the openings in one of said sections and the openings in the said plate providing means for the reception of a tool for shifting said sections relatively to each other for interlocking engagement.

In testimony whereof, I affix my signature hereto.

JOHN STANLEY MULTER.